(12) United States Patent
Husoy et al.

(10) Patent No.: US 8,332,773 B2
(45) Date of Patent: Dec. 11, 2012

(54) METHOD AND SYSTEM FOR GENERATING A CONTROL SYSTEM USER INTERFACE

(75) Inventors: Kristoffer Husoy, Oslo (NO); Torgeir Enkerud, Oslo (NO); Tone-Grete Graven, Oslo (NO)

(73) Assignee: ABB Research Ltd. (CH)

( * ) Notice: Subject to any disclaimer, the term of this patent is extended or adjusted under 35 U.S.C. 154(b) by 473 days.

(21) Appl. No.: 12/548,097

(22) Filed: Aug. 26, 2009

(65) Prior Publication Data

US 2010/0050103 A1 Feb. 25, 2010

Related U.S. Application Data

(63) Continuation of application No. PCT/EP2008/051647, filed on Feb. 12, 2008.

(30) Foreign Application Priority Data

Feb. 27, 2007 (EP) .................................. 07103132

(51) Int. Cl.
*G06F 3/048* (2006.01)
*G06F 19/00* (2011.01)

(52) U.S. Cl. ........ 715/777; 715/771; 715/853; 715/854; 715/855; 700/17; 700/83; 700/96; 700/97

(58) Field of Classification Search .................. 715/777, 715/771, 853–855; 700/17, 83, 96, 97
See application file for complete search history.

(56) References Cited

U.S. PATENT DOCUMENTS

| | | | |
|---|---|---|---|
| 6,002,398 A | 12/1999 | Wilson | |
| 6,542,796 B1 | 4/2003 | Gibbs et al. | |
| 7,043,311 B2 * | 5/2006 | Nixon et al. | 700/83 |
| 7,047,499 B2 | 5/2006 | Ferri | |
| 7,117,052 B2 * | 10/2006 | Lucas et al. | 700/83 |
| 7,146,231 B2 * | 12/2006 | Schleiss et al. | 700/83 |
| 7,237,109 B2 * | 6/2007 | Scott et al. | 713/164 |
| 7,490,313 B2 * | 2/2009 | Sinclair et al. | 717/100 |
| 8,000,814 B2 * | 8/2011 | Havekost et al. | 700/17 |
| 2002/0046290 A1 | 4/2002 | Andersson et al. | |
| 2004/0070612 A1 * | 4/2004 | Sinclair et al. | 345/762 |
| 2004/0083463 A1 * | 4/2004 | Hawley | 717/140 |
| 2004/0095371 A1 * | 5/2004 | Haynes et al. | 345/711 |

(Continued)

FOREIGN PATENT DOCUMENTS

EP 0660219 A2 6/1995

(Continued)

OTHER PUBLICATIONS

International Preliminary Report on Patentability; PCT/EP2008/051647; Dec. 2, 2009; 16 pages.

(Continued)

*Primary Examiner* — Tadeese Hailu
(74) *Attorney, Agent, or Firm* — St. Onge Steward Johnston & Reens LLC (57) ABSTRACT

A method for providing a user interface for an industrial control system includes a computer and a plurality of process graphics having software objects for controlling and/or monitoring real world objects controlled by the control system. A display of selected process graphics, a designated view arranged with a tab or other selection mechanisms, is automatically generated. The designated view is generated dependent on selecting one or more logical groupings to which control system software objects representing the real world objects belong.

47 Claims, 7 Drawing Sheets

U.S. PATENT DOCUMENTS

| | | | |
|---|---|---|---|
| 2006/0174216 A1* | 8/2006 | Peterson et al. | 715/853 |
| 2007/0088554 A1* | 4/2007 | Harb et al. | 704/257 |
| 2007/0239291 A1* | 10/2007 | Wayland et al. | 700/83 |
| 2007/0260982 A1* | 11/2007 | Wayland et al. | 715/700 |

FOREIGN PATENT DOCUMENTS

| | | |
|---|---|---|
| EP | 1376323 A1 | 1/2004 |
| WO | 0102953 A1 | 1/2001 |
| WO | 2006103541 A1 | 10/2006 |

OTHER PUBLICATIONS

International Search Report and Written Opinion of the International Searching Authority; PCT/EP2008/051647; Jun. 12, 2009; 8 pages.

* cited by examiner

METHOD AND SYSTEM FOR GENERATING A CONTROL SYSTEM USER INTERFACE

CROSS-REFERENCE TO RELATED APPLICATIONS

The present application is a continuation of pending International patent application PCT/EP2008/051647 filed on Feb. 12, 2008 which designates the United States and claims priority from European patent application 07103132.2 filed on Feb. 27, 2007, the content of which is incorporated herein by reference.

FIELD OF THE INVENTION

The invention concerns method and system for automatically providing a user interface in an industrial control system.

BACKGROUND OF THE INVENTION

In the supervisory control of industrial plants there is continual requirement for information about equipment, current and historic process data, trends, etc. This information is typically provided by the control system and usually in the form of one or more distributed control systems (DCS) and/or supervisory control and data acquisition (SCADA) systems. With the increases in computing power and advances in communication and computerized measurement there is an increasing amount of data available for the operators.

The information is today often presented to the operators through a display screen showing process graphics that presents process data (measurements, values), tag identifiers, equipment ID, alarm status, connections between plant equipment, etc. As more and more data is being presented to the operators, the visual user interfaces often hold very much information.

The task of finding the relevant technical information in a large information space is further complicated by the fact that in many situations the operator often has limited time available to make a decision. The significance of the information available will vary with the current situation. That is, users of industrial control systems have to deal at least in part with a context sensitivity problem, as in some contexts certain information will be essential and in others irrelevant.

U.S. Pat. No. 6,542,796 entitled Methods and apparatus for integrating, organizing, and accessing flight planning and other data on multifunction cockpit displays, to Gibbs, assigned to Honeywell international Inc. describes methods for integrating, organizing, and accessing flight planning and other data on cockpit displays in aircraft. The description concerns organising flight management system data on displays and mentions that different parts of a flight plan and/or information about different functions may be displayed in a series of windows each accessed by a selecting a known graphic display feature called a tab. In U.S. Pat. No. 7,047,499, entitled Method and system for controlling a tabbed pane in a graphical user interface of a data processing system, assigned to IBM, a method and system is described which provides that when a stack of tabbed panes is shown on a display and there is not enough room along the bottom of the display for all of the tabs, then some tabs may be aligned along other sides of the display.

In U.S. Pat. No. 6,002,398 entitled Navigation between property pages with tabs and menus, assigned to Novell, Inc., a method is described for displaying a tabbed dialog box, a property sheet, which has at least one child window. The parent window or property sheet has a multiple associated, displayable child windows. However at run time the described program loads all of the objects, including graphics, for all the child windows after user initiates the action which represents a heavy load on processor, display and system resources at runtime.

WO01/02953 describes a method for integration of many and various types of applications in a computerized system. This method is based on a concept where real world objects are represented as composite. Different facets of a real world object, such as its physical location, the current stage in a process, a control function, an operator interaction etc., are described as different aspects of the composite object. In this application, composite objects as defined by WO01/02953 are referred to as aspect objects.

A feature of the method described in WO01/02953 is that aspect objects can be organized in structures. A structure of aspect objects is a hierarchy of object instances. It may be based on any type of relations between aspect object instances. An aspect object can be placed in several structures at the same time, where the different structures represent different relations, e.g. functional and physical containment (functional structure and location structure).

A further application of is described in US-2002-0046290-A1. A meta object representing an entity is typically represented in several hierarchical structures at the same time within a control system. For example, a certain piece of process equipment has a certain position in a functional structure depending on the functional breakdown of the plant. It has also a physical position, and thus it has a place in a location structure. The same piece of equipment may currently be allocated to a certain production order, so it belongs to an order structure. Because it is used to produce a certain product, it also fits in a product structure.

Finding the right information in control systems is often difficult because the information space is so large. There are often hundreds or thousands of process graphics, and the task of navigation is often difficult or time consuming. The most common navigation method is to have links arranged with or around the process graphics. The navigation methods are otherwise limited to back/forward and history, context menu, display shortcut buttons and the like. Although different navigation schemes have been proposed they often demand considerable additional engineering or considerable system resources, or both.

SUMMARY OF THE INVENTION

According to an aspect of the present invention an improvement is provided in the form of a method for providing a user interface for an industrial control system wherein a user interface for an industrial control system comprising a computer and a display device (2) is provided, said system being further arranged with a plurality of process graphics comprising one or more software objects for controlling and/or monitoring real world objects controlled by said control system, which said software objects are arranged in one or more of a plurality of hierarchical functional groups or structures, arranged such that elements of one or more of the software objects or part thereof may be displayed on an interface displayed on said display device, wherein the method further comprises automatically generating one or more designated views arranged with a tab, each designated view comprising one or more tabs and comprising any of said process graphics, software objects or elements, said contents being generated dependent on location of a software object in a said hierarchy of object instances or a said structure.

According to another embodiment, the method is characterized by loading a new process graphic into the designated view (V) of the selected tab.

According to another embodiment, the method is characterized by determining which designated view to generate based on the location of the selected process graphic in the said hierarchical functional groups or structures.

According to another embodiment, the method is characterized by determining which tab to highlight in the designated view based on which said process graphic is currently displayed in the interface.

According to another embodiment, the method is characterized by detecting one or more software objects arranged in several different levels in a hierarchy or structure and generating automatically one or more tabs in a designated view arranged in a subtab of a designated view relative to a higher level designated view, providing direct access via the tabs of the subtab to objects in a lower level in said hierarchy.

According to another embodiment, the method is characterized by highlighting the tab corresponding to the currently visible process graphic, and by removing a highlight from any previous tab.

According to another embodiment, the method is characterized in that each tab contains one or more operational elements being any of the group of: process section name, device name, dynamic information, information about a as number of alarms, plots or trends, dynamic measurements, key performance indicators.

According to another embodiment, the method is characterized by associating by means of a designated view a tab of a said process graphic to one or more operational elements dependent on in which said functional groups said software object is arranged and at which level in a structure the said functional group or groups are arranged.

According to another embodiment, the method is characterized by displaying on a tab containing a static reference to a process graphic a dynamic information display or a dynamic value for a number of active alarms in a process section.

According to another embodiment, the method is characterized by selecting the one or more said software objects dependent on a logical grouping of operational elements and a process diagram in which logical grouping of said software object is arranged.

According to another embodiment, the method is characterized by automatically generating a tab view, the contents of which are dependent on at which position in a hierarchical structure below a said software object the process graphic is arranged.

According to another embodiment, the method is characterized by selecting the one or more said software objects dependent on a logical grouping in which said software object is arranged and at which level in a hierarchy the logical grouping is arranged.

According to another embodiment, the method is characterized by further comprising the action of updating the objects in a designated view with a tab, and updating the said designated view with all new objects found the corresponding hierarchical logical group.

According to another embodiment, the method is characterized by comparing any new objects found in a designated view with one or more criteria for a designated view and including the new objects meeting the criteria.

According to another embodiment, the method is characterized by comparing any new objects found in a designated view with criteria and determining a logical grouping of a new object.

According to another embodiment, the method is characterized by determining a logical grouping of a new object and storing tab information for the new object according to the logical grouping so determined.

According to another embodiment, the method is characterized by updating the objects in a tab view, and updating with any child objects of the new objects found in the tab view.

According to another embodiment, the method is characterized by further comprising the action of receiving in the control system a manual request to update the objects in a designated view, and updating the said designated view with all new objects found the corresponding hierarchical logical group.

According to another embodiment, the method is characterized by generating in the control system a prompt to an operator or other user suggesting that a manual request to update all the links or objects in a designated view should be made.

According to another embodiment, the method further comprises maintaining a given designated view arranged with a tab visible at all times on an operator display.

According to another embodiment, the method further comprises hiding a given designated view arranged with a tab on an operator display when one or more conditions are met.

According to another embodiment, the method further comprises displaying context-sensitive information in a sub tab view of the selected tab view.

According to another embodiment, the method further comprises automatically generating a view of the locations of all instances of a given software object in one or more structures in the control system.

According to another embodiment, the method further comprises detecting a computer cursor or mouse position over a tab and displaying a small graphic or thumbnail of a destination process graphic accessible from the designated view by means of the tab.

According to another embodiment, the method further comprises a designated view arranged with a tab or similar, further arranged with means to select by means of layers which of the available items of said information shall be visually displayed or otherwise presented prominently, or displayed less prominently, or hidden.

According to anther embodiment an improved method for providing a user interface for an industrial control system is described automatically generating one or more designated views arranged with a tab, each designated view comprising one or more tabs and comprising any of said process graphics, software objects or elements, the method further comprising loading a new process graphic into the designated view of a selected tab of a designated view.

According to anther embodiment an improved method for providing a user interface for an industrial control system is described automatically generating one or more designated views arranged with a tab, each designated view comprising one or more tabs and comprising any of said process graphics, software objects or elements, the method further comprising determining which designated view to generate based on the location of the selected process graphic in the said hierarchical functional groups or structures.

According to anther embodiment an improved method for providing a user interface for an industrial control system is described automatically generating one or more designated views arranged with a tab, each designated view comprising one or more tabs and comprising any of said process graphics, software objects or elements, the method further comprising determining which tab to highlight in the designated view based on which said process graphic is currently displayed in the interface.

According to anther embodiment an improved method for providing a user interface for an industrial control system is described automatically generating one or more designated views arranged with a tab, each designated view comprising one or more tabs and comprising any of said process graphics, software objects or elements, the method further comprising detecting one or more software objects arranged in several different levels in a hierarchy or structure and generating automatically one or more tabs in a designated view arranged in a subtab of a designated view relative to a higher level designated view, providing direct access via the tabs of the subtab to objects in a lower level in said hierarchy.

According to anther embodiment an improved method for providing a user interface for an industrial control system is described automatically generating one or more designated views arranged with a tab, each designated view comprising one or more tabs and comprising any of said process graphics, software objects or elements, the method further comprising displaying on a tab containing a static reference to a process graphic a dynamic information display or a dynamic value for a number of active alarms in a process section.

According to anther embodiment an improved method for providing a user interface for an industrial control system is described automatically generating one or more designated views arranged with a tab, each designated view comprising one or more tabs and comprising any of said process graphics, software objects or elements, the method further comprising associating by means of a designated view a tab of a said process graphic to one or more operational elements dependent on in which said functional groups said software object is arranged and at which level in a structure the said functional group or groups are arranged.

This invention uses the hierarchical structures of objects in an industrial control system to automatically generate and configure tabs for navigating or browsing. Tabbed browsing is a method of moving from one page to another page by clicking on a tab, a method which has been used in office applications and web browsers. However, according to the invention certain designated views which are arranged with tabs are generated by automatically reading the hierarchical object structure in the control system software and grouping objects according to their level in the structure, or tree structure, so that the tabs can be generated automatically.

Process graphics are the mainstay of most industrial control systems. All of the control objects are placed in a context of one or more process graphics. There are different ways to group these process graphics, preferably based on a logical structure and/or relationship(s) between them. As an example, there can be a set of top-level graphics that act as overview graphics to the process graphics. One level down the process graphics that show the functionality for one area of this top-level are arranged. Subsequently, at a lower level than that, there are the detail graphics that show details for one or a few of the components in the process graphics.

In addition there can be other groupings such as shutdown matrices, fire & gas graphics or other functionally separated graphics for the top-level area. These different graphics could be grouped for example such that:

All top-level overview graphics are grouped together
All process graphics in one top-level area are grouped together
All detail graphics for one process graphic are grouped together
All shutdown matrices or other functional graphics are grouped together Configuration and interaction with navigation tabs can be related to a system, a state of the system, a specific user task, different types of users and to accompany specific user preferences as recorded for example in user profile, user or needs. On a system level it is important to relate the grouping arranged with a navigation tab to an application of the system or a task that is to be preformed. In many cases a process graphic or the representation may be directly linked to a control object or a configuration setting. It is also possible to implement this as specific workplaces tailored to the application or task to be preformed. These specific workplaces use the tabs to be able to access the appropriate information for the application or task and easily switch between a plurality of appropriate displays, or designated views. For example these may be operations such as start up, operate, change operation, alarm handling tasks, specific process related tasks, maintenance tasks, active or past work orders, emergency actions, shut down and so on.

In addition, the user interface may also be arranged to adapt according to user preferences, system state or current work tasks. The advantage of this mode is that it supports active exploration into the system by the operators.

According to another aspect of the present invention an improvement is provided in the form of an improved user interface for an industrial control system which also comprises a computer and a display device, said system being further arranged with a plurality of process graphics comprising one or more software objects for controlling and/or monitoring real world objects controlled by said control system, which said software objects are arranged in one or more of a plurality of hierarchical functional groups or structures arranged such that elements of one or more of the software objects or part thereof may be displayed on an interface displayed on said display device wherein the user interface further comprises, computer program means for automatically generating one or more designated views each said designated view comprising one or more tabs and further comprising any of said process graphics software objects or elements, which contents are generated dependent on location of a software object in a said hierarchy of object instances or a said structure.

According to another embodiment an improvement is provided in the form of a user interface for an industrial control system, said system being further arranged with a plurality of process graphics comprising one or more software objects for controlling and/or monitoring real world objects controlled by said control system, which said software objects are arranged in one or more of a plurality of hierarchical functional groups or structures arranged such that elements of one or more of the software objects or part thereof may be displayed on an interface on said display device where the user interface comprises, computer program means for automatically generating one or more designated views each said designated view comprising one or more tabs, and wherein the user interface is arranged with computer hardware and software means for loading a new process graphic into the designated view of the selected tab.

According to another embodiment an improvement is provided in the form of a user interface for an industrial control system, said system being further arranged with a plurality of process graphics comprising one or more software objects for controlling and/or monitoring real world objects controlled by said control system, which said software objects are arranged in one or more of a plurality of hierarchical functional groups or structures arranged such that elements of one or more of the software objects or part thereof may be displayed on an interface on said display device where the user interface comprises, computer program means for automatically generating one or more designated views each said designated view comprising one or more tabs, and wherein the user interface is arranged with computer hardware and software means for highlighting a tab in the designated view based on which said process graphic is currently displayed in the interface.

According to another embodiment an improvement is provided in the form of a user interface for an industrial control system, wherein the user interface comprises is arranged with computer hardware and software means for automatically displaying, on a tab containing a static reference to a process graphic, a dynamic information display or a dynamic value.

According to another embodiment an improvement is provided in the form of a user interface for an industrial control system, wherein the user interface comprises means for automatically displaying on a tab a dynamic value for the number of active alarms for a process section.

Embodiments of the invention may advantageously be used for control purposes in a control system of an oil or gas production, storage, treatment or process installation. Embodiments of the invention may also be used for control purposes in a control system for other industrial, manufacturing or process installations, such as in the pulp & paper, oil & gas, chemistry & life sciences, and transportation industries (such as railway control systems), and also used in an installation for generation, transmission or distribution of electrical energy.

In a preferred embodiment of the methods of the invention one or more methods may be carried out by a computing device comprising one or more microprocessor units or computers. The control unit(s) comprises memory means for storing one or more computer programs for carrying out the improved methods. Preferably such computer program contains instructions for the processor to perform the method as mentioned above and described in more detail below.

BRIEF DESCRIPTION OF THE DRAWINGS

Embodiments of the invention will now be described, by way of example only, with particular reference to the accompanying drawings in which.

DETAILED DESCRIPTION OF THE INVENTION

This invention describes a system for and a method of generating technical information comprising both static and dynamic data in industrial supervision, maintenance and control. The trend towards operation from remote operation centres introduces an increase in both the control room operators' work domain and the workload as several different processes can be supervised and controlled in parallel.

Figure 2:
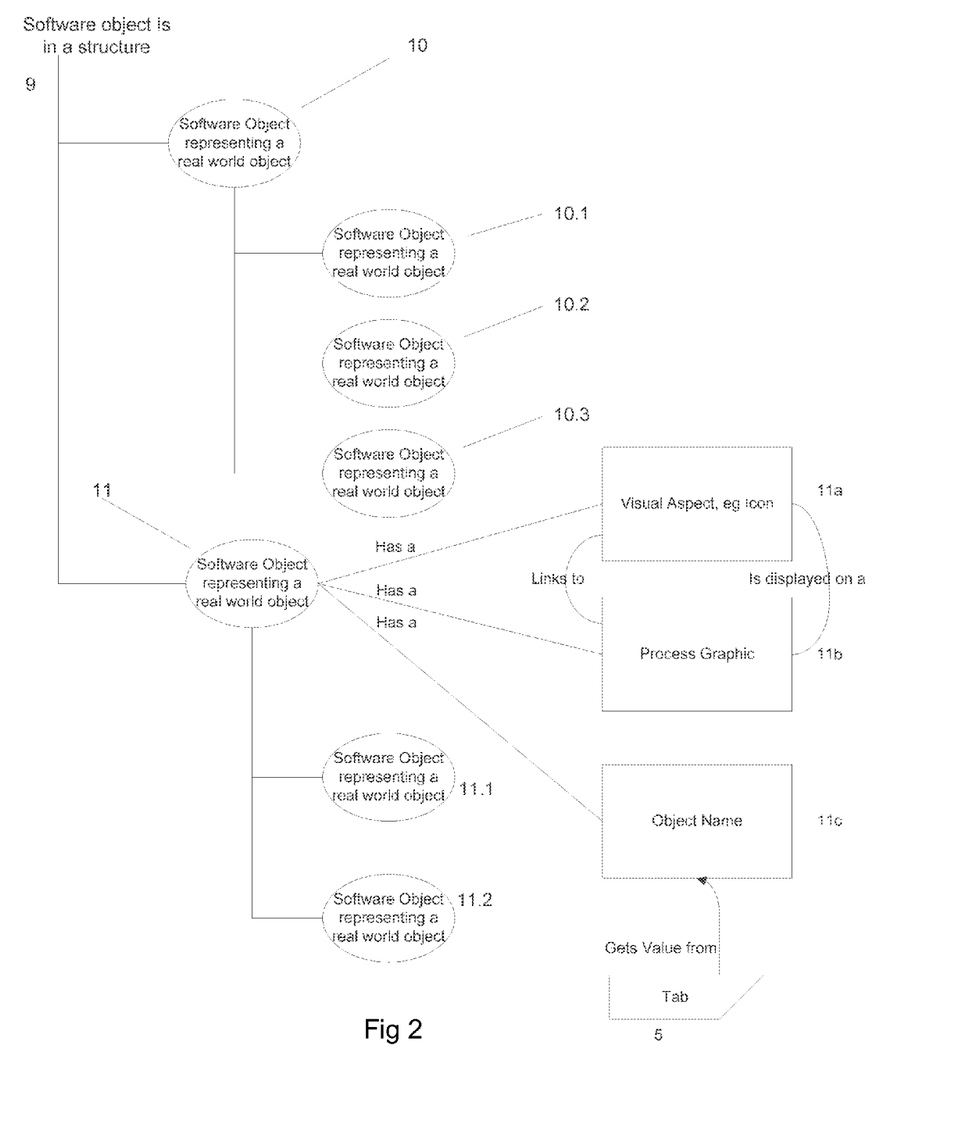
FIG. 2 is a block diagram showing an arrangement of a group with a tab and a naming convention used in this description.

FIG. 2 shows an arrangement of software entities and a data structure and a naming convention used in this description. FIG. 2 shows a software structure or architecture structure 9 of an industrial control system (not shown) in which are arranged two software objects 10, 11, each of which are also arranged with at least one level of software objects 10.1, 10.2, 10.3 and 11.1-3. A software object may also, as in the case shown for software object 11, comprise one or more software entities called here Aspect objects 11a, 11b, 11c. The software objects 10, 11, each represent some facet of a real world object for a control purpose. Structure 9 is a hierarchy of object instances. A software object such as 10 or 11 can be placed in several different structures at the same time, where the different structures represent different relations, e.g. functional and physical containment. Thus relations may be such as functional structure eg electrical system, process section, piping layout; and location structure may be a building location, area location, room location, which storey or level, and so on. The same pump or filter may be represented in a process diagram, a location in a plant by building, floor, and area etc as well as in an electrical diagram, a detail process diagram, a process piping diagram and so on, which may be in a similar way as the structures described in WO01/02953 or US-2002-0046290-A1, of which the latter is hereby incorporated in this specification in its entirety by means of this reference.

Thus software object 11 comprises in some way an associated aspect object 11a which is a Visual object eg an icon, a graphic representation of a device or a function. There is also an aspect object for a Process graphic 11b and for an Object name 15c. The Visual object 11a may be displayed on the process graphic to show a pump or filter or a process section etc. The Object name of the software object representing the device (or function) that the Process graphic 11b, Visual aspect 11a etc are associated with is held by the Object name 11b.

A tab 5 obtains the Object name from the Object name 11c aspect object. On selecting a given tab, the tab 5 gets the Object name of the software object, in this case 11, from aspect object 11c such that the view V selected by the tab in this example, would display the Process graphic of 11b.

Figure 1:
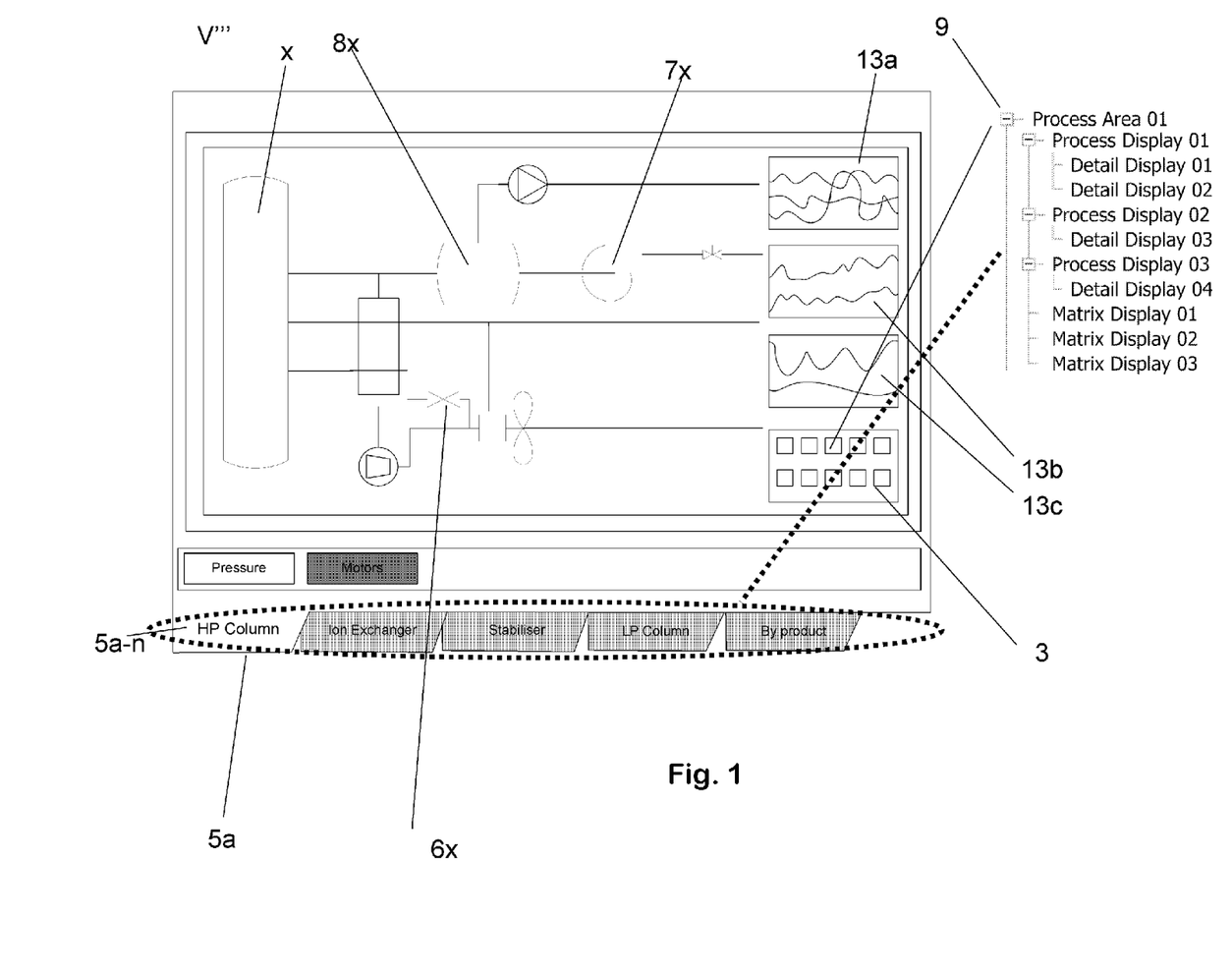
FIG. 1 is a schematic diagram for an improved user interface for an industrial control system wherein information is presented in a view arranged with one or more tabs according to an embodiment of the invention.
Figure 4:
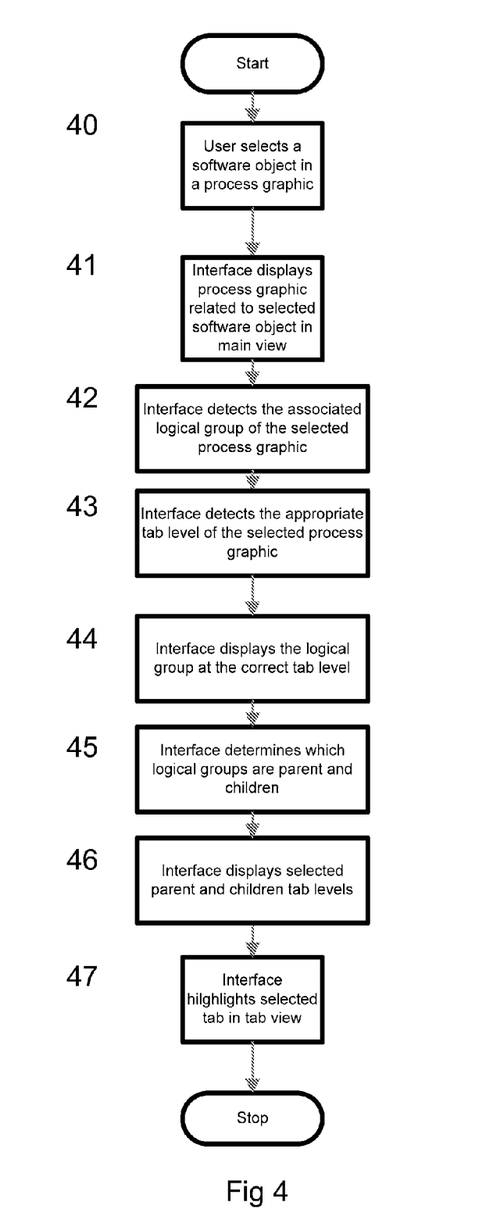
FIG. 4 is a flowchart for a method to display a user interface for an industrial control system by selecting on a display means a visual object in a view provided according to an embodiment of the invention.

FIG. 4 shows a flowchart for a method for the user initiating a navigation to a new process graphic by selecting a software object in a previous process graphic:

40. User selects a software object in a process graphic; eg by clicking on an icon or other visual object,
41. Interface displays process graphic related to selected software object in the main view;
42. Interface detects the associated logical group of the selected process graphic;
43. Interface detects the appropriate tab level of the selected process graphic;

44. Interface displays the logical group at the correct tab level;
45. Interface determines which logical groups are parent and children;
46. Interface displays selected parent and children tab levels; ie tabs for all available process detail views are displayed,
47. Interface highlights selected tab in tab view;

FIG. 1 shows an application in a control system including an integrated HMI interface 1. The figure shows a number of process graphics for part of a system in a view V'''. The view displayed is accessed by the tab, eg tab 5*a*, which is shown blank and without shading to indicate that it is currently "selected". Tab 5*a* is also marked HP Column. Tab 5*a* is one of several tabs 5*a-n* arranged in a tab view 4 of view V'''. The tabs 5*a-n* are shown arranged visible as they would be on a display device showing a display of a selected process graphic, and then shown below the graphic display duplicated in a schematic way for the purpose of clarity. All the tabs available with a process detail view are displayed in the tab view 4. The unselected tabs are shown grayed or with a pattern (see also FIG. 3*a*-3*b* described below).

The process graphic of FIG. 1 includes a number of visual objects or icons 6*x*, 7*x*, 8*x*, each representing a function or aspect of a real world object, which real world object is controlled by software entities and software objects in the control system such as software objects 10, 11. FIG. 1 also includes a structure 9 of software objects to which the items displayed on Interface 1 are linked. The figure shows icons or pictures for eg two process vessels, a pump 7*x*, a valve 6*x* in a view of a process displayed by selecting by the tab 5*a*, which is also indicated as Hp Column. Referring also to FIG. 2, we can say that eg a process vessel icon, valve icon etc is a visual object and schematically the same as icon or visual object 11*a*. The process graphic of FIG. 1 may be provided by a process graphic such as the Process Graphic 11*b* of the software object 11, and the tab name "Hp Column" is an Object name for this process graphic, and is read by the Object name 11*c* aspect object from FIG. 2 from the Software object it is associated with in the structure, in this case Process Display 01.

Thus this invention may be arranged to use the structures of objects in a software architecture of a control system, such as the control system supplied by ABB called 800xA, to automatically generate tabs for browsing or navigating in a complex hierarchical system. The tabs may be configured semi-automatically. By automatically reading a hierarchical object structure and grouping objects according to their level in a tree structure, the tabs can be generated automatically. There are different ways to group these process graphics in a view selected by a tab, based on the logical structure and/or relationships between them.

The tabs can show more information than just the graphic it links to. For example it may be arranged to display dynamic information such as information about how many top-level alarms are active in the graphic currently displayed by selecting the present tab. The tabs can also be configured based on the user or the user's role, workstation or other personalization criteria. Certain of the tabs can be visualized with distinguishing factors based on type or level. It is important that different functional information on a display may be quickly identified according to its purpose by an operator, and with a minimum of effort. this is particular important for the operator to find the most relevant information during an alarm or emergency situation. Functionally appropriate and task or operator adapted displays are also important to reduce unnecessary effort which may lead to operator fatigue. For example, top-level tabs have one visual appearance, or look & feel, and detail graphics have another. Such a configuration can conveniently be stored as a xml-file or other structured text format.

FIG. 1 also shows other graphical user interface control means such as navigation buttons at the bottom right of the display. This is shown as an area of buttons, or icons or other graphical representations in a panel or a ribbon, which provide direct access to frequently required areas, and/or functions, of the control system. For example as a button to access top level sub areas in plant, a button to click on to get to new tab view at a higher level in a structure, or a button to go to different parts of the plant. A sub panel or ribbon may also be used to display items such as process areas, process trends, other graphics, or detail graphics.

The tabs can be implemented as one object on the top-level, or one object for each of the functional areas. The tabs can also be arranged into a separate panel, so the tabs do not need to be included in all process graphics. The tab configuration can also include filtering to only include objects relevant to an operator interface.

As described above tab configuration can be configured or engineered to relate to working tasks, system status, information types and user preferences. There are at least two basic ways to relate presentation objects in a tabbed view. The tab view can either be predefined to include a set of objects or configured based on properties of the presentation objects. These two approaches are not exclusive and a single object can relate to both predefined tabs and to a local tab for a group of presentation objects used in a single presentation. Predefined tabs may relate to work tasks, system states, user preferences or information types. Local tabs may for example relate to system states, user preferences and information types.

The grouping of these information objects can be done according to many different criteria. Examples might be to group objects according to presentation mode (e.g. textual, graphical, auditory, visual), data type (current/historic, analog/digital), functional aspects (electrical, process, cooling system, fire & gas, etc) or other logical relationships.

In performing different tasks and in the supervision of different process states, the operator will have different requirements for information. That means that the information presented needs to be context sensitive. An example of a state of a process that creates specific information needs and increased workload for the operator is start-up and shutdown of the plant. Such information may be arranged as one or more Matrix displays subtab views, see for example structure 9 in FIGS. 1, 3*b*, 7.

Figure 5:
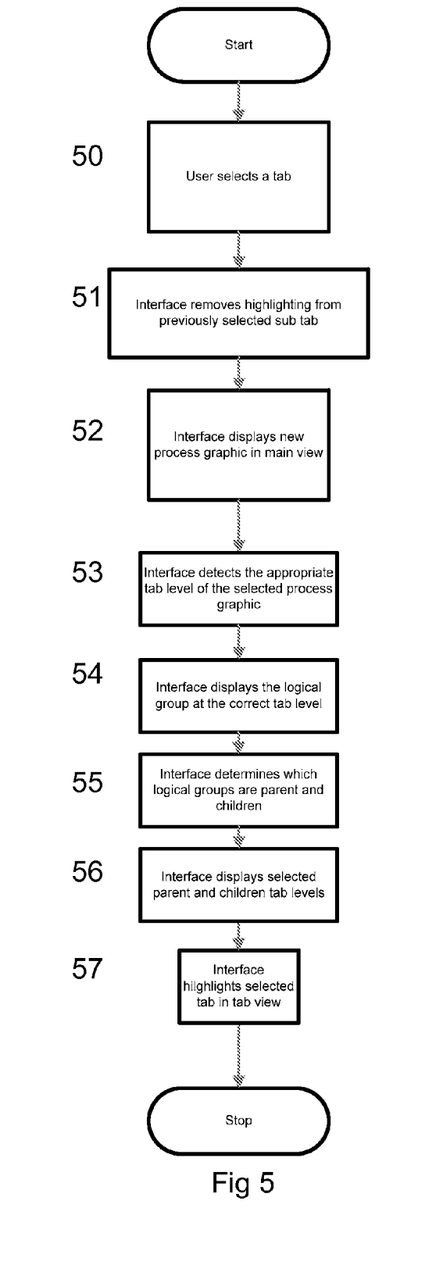
FIG. 5 is a flowchart for a method to display a user interface for an industrial control system by selecting a tab on a display means arranged in a display relative to a view provided by according to an embodiment of the invention.

FIG. 5 shows a flowchart for a method for navigating in a complex system, accessing a desired view of eg a process graphic, namely by selecting a tab, such as tab 5*a* in FIGS. 1, 2, 3*a-b*:

50. User selects a tab;
51. Interface removes highlighting from previously selected subtab, if any;
52. Interface displays new process graphic in main view;
53. Interface detects the appropriate tab level of the selected process graphic;
54. Interface displays the logical group at the correct tab level;
55. Interface determines which logical groups are parent and children;
56. Interface displays selected parent and children tab levels;
57. Interface highlights selected tab in tab view;

The visual objects or graphic elements or other objects that make up the desired process graphic displayed by selecting a "new" tab are only loaded on selection of the tab and its associated process graphic, so that the system resources consumed by these methods are minimal.

Navigating by tabs between different process graphics, to or from different process displays, and to or from different detail displays is thus provided by tabs. The tabs provided by the invention may be likened to a set of simple signposts for navigating in an otherwise array of complex and hierarchical entities. The set of tabs is automatically generated from the underlying software object architecture, the structures.

Figure 6:
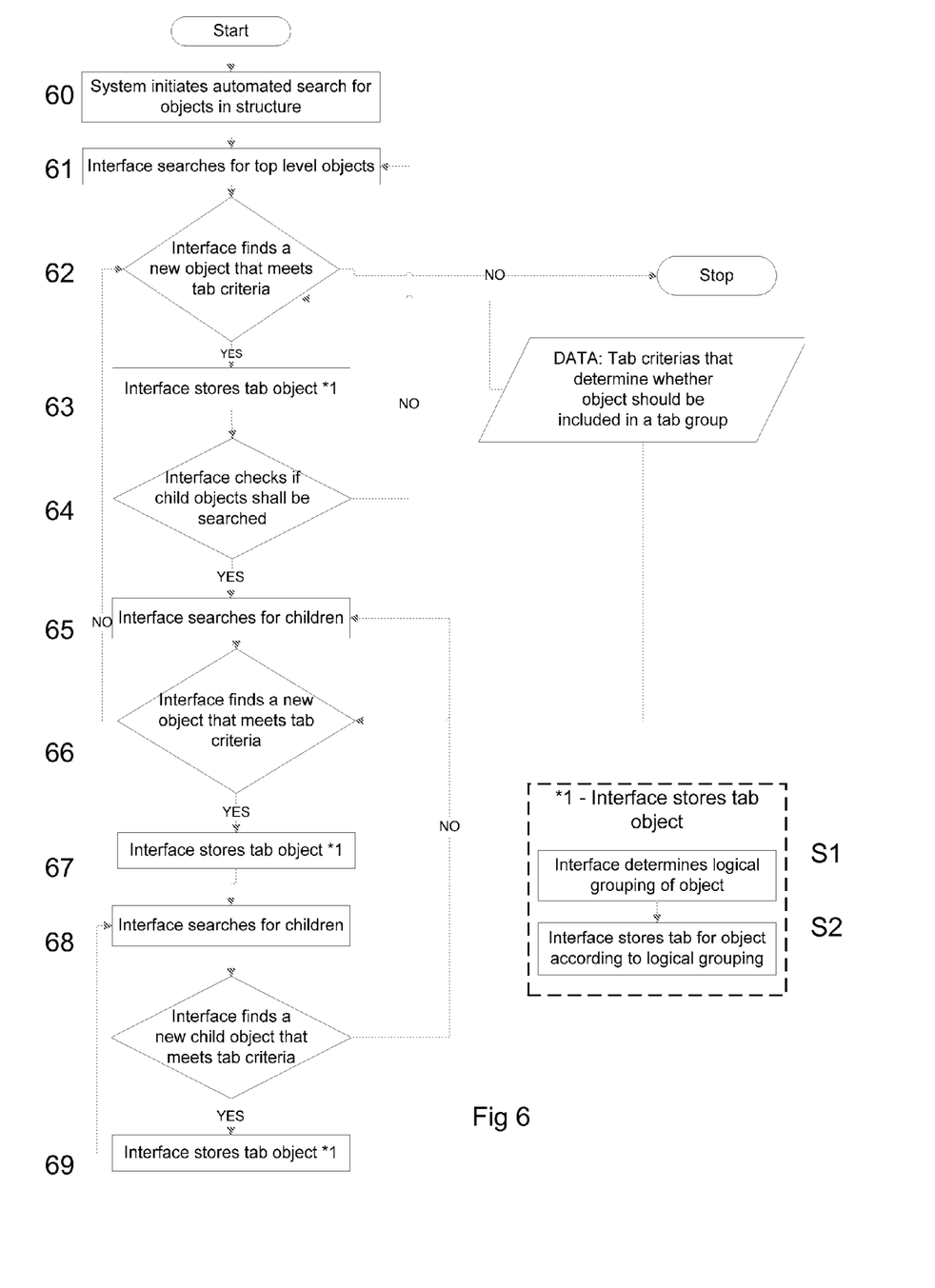
FIG. 6 is a flowchart for a method to configure industrial control system such that a user interface when subsequently displayed comprises one or more tabs for switching between views according to an embodiment of the invention.

FIG. 6 shows a configuration method that establishes which objects shall be configured to be displayed in a view arranged with a tab. The method comprises at least the steps of:

- 60. System initiates an automated search for objects in a structure;
- 61. Interface searches for top level objects;
- 62. Interface finds a new object that meets tab criteria, results in either No, then Stop, or Yes then
- 63. Interface stores tab object *1,
- 64. Interface checks if child object shall be searched, if No the Interface stops or goes back to step 61;
- 65. if yes then Interface searches for children, then
- 66. reiterates in effect steps 62,63 and on finding a new (child) object that meets tab criteria
- 67. stores tab object *1; then
- 68. reiterates in effect steps 62,63 and on finding a new (child) object that meets tab criteria
- 69. stores tab object *1;

until each new object, and any child object of it, has been found and stored as a tab object *1 where
storing the tab object *1 may comprise steps such as
interface determines a logical grouping of an object, and
interface stores tab for the object according to the logical grouping.

When evaluating a new object the Interface may access DATA to obtain criteria which may be used to determine whether an object should be included in a logical grouping of a tab or not. The tabs are not refreshed during normal operation, and so new objects are only searched for and added during commissioning, or during maintenance etc., with the option updating following a manual request. Thus as shown in FIG. 6 tabs may be generated automatically and depending on the position of objects in a hierarchical structure of a control system.

Figure 7:
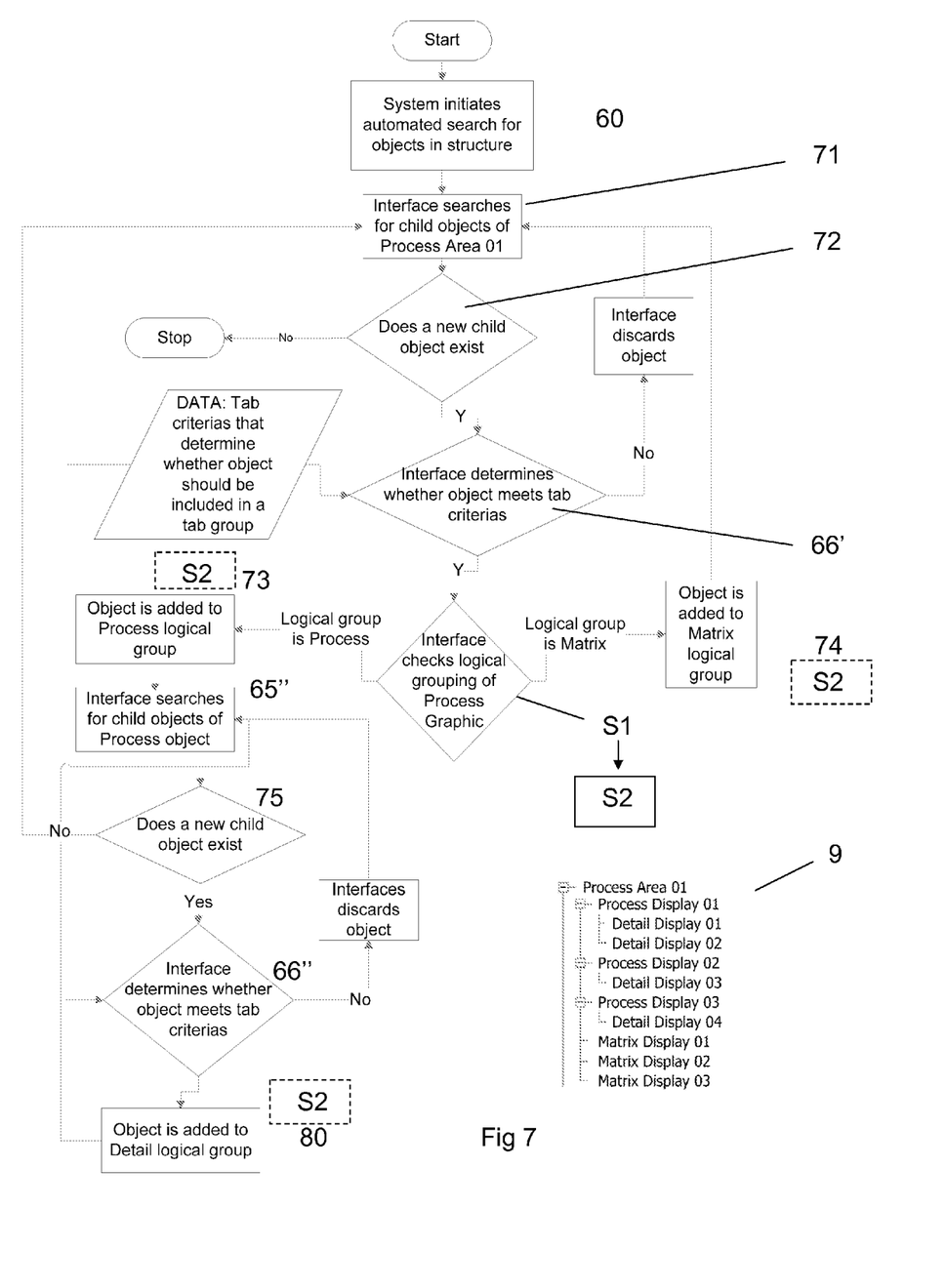
FIG. 7 is a flowchart demonstrating an example for configuring a process area to be arranged with views each comprising one or more tabs.

FIG. 7 shows a flowchart of an example of an application of the method for configuring tabs and tab fields. FIG. 7 includes a diagram of a structure 9 for a Process Area 01 which comprises a number of child objects which are software objects Process Display 01, Process Display 02, Process Display 03, Matrix Display 01, Matrix Display 02, Matrix Display 03. Process Display 01 has two child objects, Detail Display 01 and Detail Display 02. Process Display 02 has one child object, Detail Display 03, as has Process Display 03 which has child object Detail Display 04.

In an application of the basic engineering method, configuration method of FIG. 7 the following steps occur:

- 60. System initiates an automated search for objects in a structure; as in FIG. 6,
- 71. Interface searches for child objects of a software object, Process Area 01,
- 72. Decision made for Does a new child object exist;
- 66'. If yes, Does it meet tab criteria (from DATA);
- S1. If yes the Interface checks logical grouping of process graphic and
- 72. adds to Process Logical group or
- 73. adds to Matrix logical group and
- S2. stores the tab object according to its logical grouping; may be stored S2 in some way associated with the logical grouping established in 72 or 73,
- 65'. Interfaces searches for child objects of the Process Object, eg Process Display 01,
- 75. Decision for does a new child object exist (of Detail Display 01);
- 66'. If yes, does it meet tab criteria (from DATA);
- 80. If yes, then added to a Detail logical group, a logical group that is identified dependent on position of an object such as Detail Display 01 or 02 in the structure 9.

Step 60 is so numbered because it is essentially the same step as 60 of FIG. 6; likewise step 66' and 66" is like step 66 of FIG. 6 which in effect reiterated steps 62,63 on finding a new (child) object and checking tab criteria; and step 65', searching for a new child object, is essentially the same as 65 of FIG. 6. The tabs may be stored S2 after determining which logical group they belong to, and optionally tab objects for each logical grouping may be stored separately in some way, as indicated by the S2 blocks shown with a dotted line for each logical grouping.

According to a development of the invention, more than one array of tabs may be grouped according to a logical place in a parent-child hierarchy for a software object. Thus in FIG. 3a a display device 2 schematically displays an interface 1' on a main part of a graphical display. On a secondary part of the graphical display a tab view 5 is shown including six tabs, of which one is blank to indicate that it is currently selected, and five tabs shown with a pattern (grayed) to indicate not-selected or inactive. In addition, a second row of tabs, subtabs 4 are shown on the display. The subtabs provide access to process graphics present which are logically related the selected tab (which selected tab represents a given process graphic from a higher level in the structure). In terms of the example process detail graphics such as Detail Display 01 and Detail Display 02 associated with Process Display 01 may be accessed by the sub tabs 4 on the subtab view. Thus selecting tab 5 of FIG. 3a results in loading and displaying the corresponding process graphic in the view V, and the loading and displaying of the subtabs 4 in the view V. Likewise the selection in FIG. 3b of tab Process Display 01 in view V' has loaded and displayed the Process Display 01 in the view V, and the loaded and displayed the subtabs including Detail Display 01 subtab in the subtab view V' by virtue of the position of the software objects in a hierarchical structure such as structure 9.

Figure 3A:
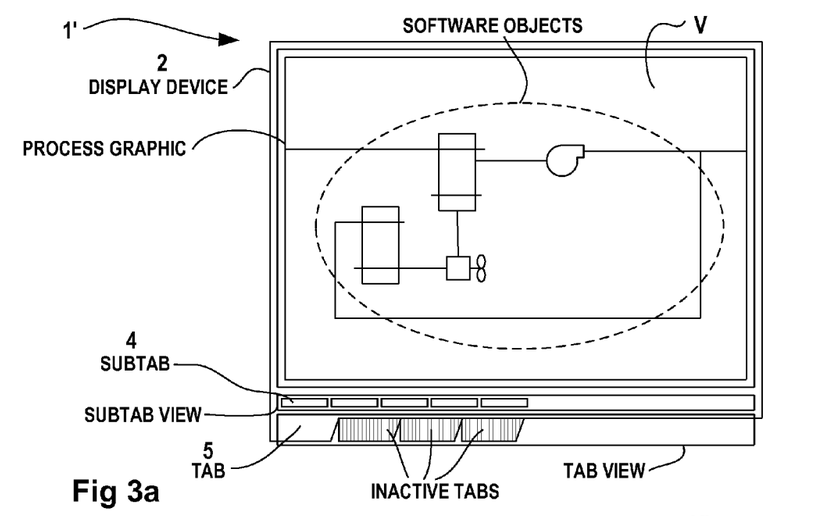
FIG. 3a is a schematic diagram of a display including one or more tabs and arrangement of tabs according to an embodiment of the invention.
Figure 3B:
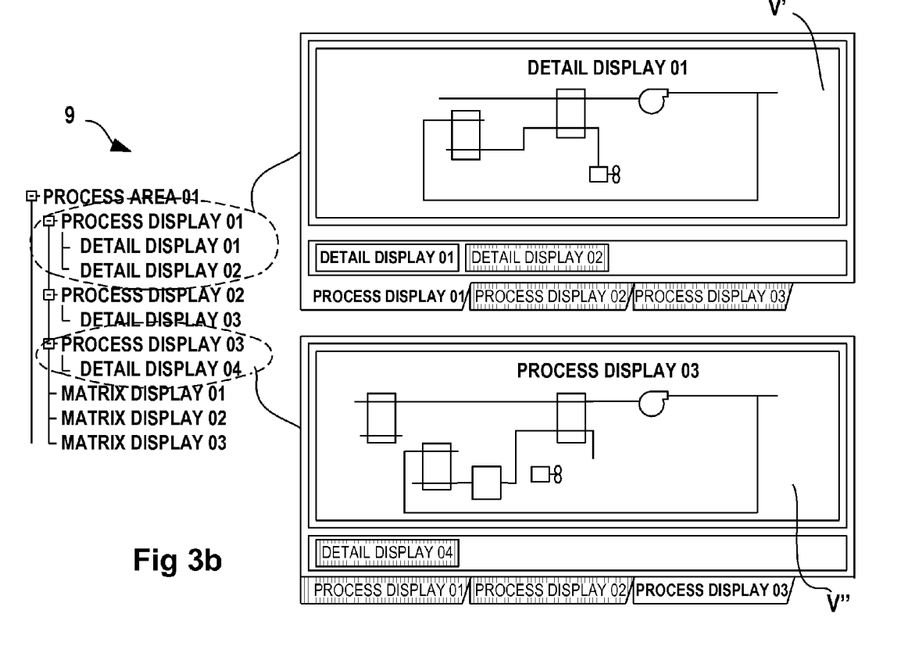
FIG. 3b is a schematic diagram of a display showing further displays reachable by navigating with one or more tabs.

FIG. 3b illustrates the displays provided by a structure 9, in more detail. The upper view shows how the displays are provided for Process Display 01 and its child objects. The tab 5 for Process display 01 has two subtabs 4 associated with it, Detail Display 01 and Detail Display 02. This relationship is automatically constructed from the structure, and may be seen in the structure that software object Process Display 01 has two child objects Detail Display 01 and 02. In the example view shown in FIG. 3b upper, Detail Display 01 is shown selected and the tab to access Detail Display 02 is grayed.

The second, lower, view also reflects the structure diagram. It shows a Process Display 03 which has one associated subtab only, which is Detail Display 04. Thus the user can switch via a tab between Process Display 04 and its associated child object, Detail Display 04.

Maintenance personnel, for example, need specific information in order to plan maintenance, such as run-time measurements, vibration measurements, maintenance alerts/alarms, active or past work orders connected to the equipment etc. Specific tabs with maintenance information can be made available to maintenance personnel, allowing him or her to work in the same system as the control room operators but with different information presented or the same type of information presented but grouped in different ways depending on a maintenance etc function or task.

The invention relates to systems that are used by operators in control rooms today, but may also be very relevant for new types of control room interfaces. Current control room interfaces are normally based on desktop computers with one or more desktop monitors and/or one or more large screens. The concept could be used in such a setting, but it could also be used for mobile interaction devices such as tablet-pc's, mobile phones, electronic paper, virtual or augmented reality systems, PDAs, multi-modal interfaces, etc.

The method can be used on any system for process information visualization that is used to present groups of information that can be of varying relevance to the operator depending on the current context. The process visualization system can for example be P&ID based graphics, abstraction hierarchies, model-based representations, 3D visualizations or abstract visualizations of process information. A description of a 3D representation of an industrial process arranged in conjunction with a control system is described in application U.S. 60/667,080, which specification is hereby included in its entirety by means of this reference.

As described in reference to a preceding embodiment, the tab of a designated view V, V', V" is automatically generated based on a hierarchical object relationship and used to navigate to one or more parts of the control system. The tabs thus represent alternative navigation opportunities for the operator, so clicking on a tab will take the operator to a different location in the control system. In this embodiment, the tabs are thus mainly a means for navigating between process graphics. This to be understood to be in stark contrast to the concept of using tabs for managing open windows.

In an alternative embodiment, one or more particular tabs may be used to switch between two or more windows which are already open. This functionality may be used to provide quicker access, for example with graphics-rich process diagrams, which have been opened once, loaded in memory, such that an operator may switch back and forth between a number or already open windows when necessary by means of a single command such as a keyboard command activating for example the keys Alt+Tab or other convenient selection means.

In another embodiment, a tab may be arranged to display all instances of the same object which exist in some or all structures. Thus the position or location of all instances of the same object is found and the result displayed in one or more simple formats. In this embodiment certain tabs are used to show all locations of this object in different structures. This is a frequently used function during configuration, maintenance or other operations in which the presence or location of a particular object has to be determined.

In another embodiment, a tab of a designated view may be arranged to display a reduced scale or thumbnail picture of the process graphic that the tab, on selection, leads to. This gives the user a preview or a guide, activated for example on mouse roll over, that is to say, by the user positioning a cursor or mouse pointer over the tab. The thumbnail may be a small static image, for example a bitmap, showing the process graphic that the tab leads to. The thumbnail may alternatively be a reduced scale version of the actual process graphic from the destination, when system resources permit. Otherwise, because of issues such as the use of resources, time lag for updating and so on, the thumbnail may be a library element, or a library element updated only at restricted intervals, such as for example updated each time that the designated view holding the process graphic is closed. Alternatively, the thumbnail image may be live but updated on a low priority basis, for example within 10 seconds. When a thumbnail or a static thumbnail is used, additional information may be added to the image. For example one or more simple indicators, representing a blinking lamp or similar, may be superimposed on the process graphic to show an alarm, or alarm still open, or a particular class of event.

In a development, the small images or thumbnail pictures may be arranged to appear on command relative to a designated tab view, and a keyboard command such as "Alt+Tab" or other command used to switch between tabs arranged in designated views.

In an international application WO2006103541 A1 entitled Method and system for providing a user interface, hereby incorporated in full in this specification by means of this reference, it is described that information is presented at least in part displayed in layers or filters on one or more display screens of a control system; and that the content for the layers, which also provide an interface to a process state or function, is determined based on information available from said control system, dependent on which of the available items of said information shall be visually displayed or otherwise presented prominently, or displayed less prominently, or hidden.

In a development of a further embodiment of the present invention.

The feature of displaying process information distributed between layers is combined with the feature of designated views arranged with a tab. Thus for example during a particular operation, for example an optimization task, the layer function may used to select that a layer of the process graphic shall be visible or not visible. Thus a layer comprising a process flow function or a process control function or a location schema may on selection be switched display visible or not visible by means of layers. This may be arranged for different functions, configuration, maintenance, optimization or for different operations, for example start up, trouble shooting, change of operation state and so on.

Methods of the invention may be supervised, controlled or carried out by one or more computer programs. One or more microprocessors (or processors or computers) comprise a central processing unit CPU connected to or comprised in one or more of the above described crane control units, which processors, PLCs or computers perform the steps of the methods according to one or more aspects of the invention, as described for example for operating or controlling a system of two industrial handlers and two presses, as described with reference to FIGS. 4-7. It is to be understood that the computer programs for carrying out methods according to the invention may also be run on one or more general purpose industrial microprocessors or PLCs or computers instead of one or more specially adapted computers or processors.

The computer program comprises computer program code elements or software code portions that make the computer or processor perform the methods using equations, algorithms, data, stored values, calculations, synchronisations and the like for the methods previously described, and for example in relation to the flowcharts of FIGS. 4-7, and/or to the graphic user interfaces of FIGS. 1, 3a, 3b. A part of the program may be stored in a processor as above, but also in a ROM, RAM, PROM, EPROM or EEPROM chip or similar memory means. The or some of the programs in part or in whole may also be stored locally (or centrally) on, or in, a memory storage device of a control system, and/or on suitable computer readable medium such as a magnetic disk, CD-ROM or DVD disk, hard disk, magneto-optical memory storage means, in volatile memory, in flash memory, as firmware, or stored on a data server. Other known and suitable media, including removable memory media, a USB memory stick and other removable flash memories, hard drives etc. may also be used. The program may also in part be supplied or updated from a data network, including a public network such as the Internet.

It should be noted that while the above describes exemplifying embodiments of the invention, there are several variations and modifications which may be made to the disclosed solution without departing from the scope of the present invention as defined in the appended claims.

What is claimed is:

1. A method for providing a user interface for an industrial control system comprising a computer and a display device, and a plurality of process graphics comprising one or more software objects for controlling and/or monitoring control objects controlled by said industrial control system, said one or more software objects being arranged in one or more of a plurality of hierarchical functional groups or structures, arranged such that elements of said one or more of the software objects or part thereof may be displayed on an interface displayed on said display device, the method comprising:
   automatically generating one or more designated views arranged with a tab for loading a new process graphic into the designated view of a selected tab;
   updating the objects in a designated view with a tab and updating the said designated view with all new objects found the corresponding hierarchical logical group;
   comparing any new objects found in the designated view with one or more criteria for the designated view and including the new objects meeting the criteria;
   comparing any new objects found in the designated view with criteria and determining a logical grouping of a new object; and
   displaying the one or more designated views, each designated view comprising one or more tabs and comprising any of said process graphics, software objects or elements, dependent on location of a said software object in a said hierarchy of object instances or a said structure.

2. The method of claim 1, further comprising loading a new process graphic into the designated view of the selected tab.

3. The method of claim 2, further comprising determining which designated view to generate based on the location of the selected process graphic in the said hierarchical functional groups or structures.

4. The method of claim 3, further comprising determining which tab to highlight in the designated view based on which said process graphic is currently displayed in the interface.

5. The method of claim 4, further comprising selecting the one or more said software objects dependent on a logical grouping in which said software object is arranged and at which level in a hierarchy the logical grouping is arranged.

6. The method of claim 3, further comprising:
   detecting one or more software objects arranged in several different levels in a hierarchy or structure; and
   generating automatically one or more tabs in a designated view arranged in a subtab of a designated view relative to a higher level designated view, providing direct access via the tabs of the subtab to objects in a lower level in said hierarchy.

7. The method of claim 2, further comprising highlighting the tab corresponding to the currently visible process graphic, and by removing a highlight from any previous tab.

8. The method of claim 1, characterized in that each tab contains one or more operational elements being any of the group of: process section name, device name, dynamic information, information about a as number of alarms, plots or trends, dynamic measurements, key performance indicators.

9. The method of claim 8, further comprising associating by means of a designated view a tab of a said process graphic to one or more operational elements dependent on in which said functional groups said software object is arranged and at which level in a structure the said functional group or groups are arranged.

10. The method of claim 8, further comprising displaying on a tab containing a static reference to a process graphic a dynamic information display or a dynamic value for a number of active alarms in a process section.

11. The method of claim 1, further comprising selecting the one or more said software objects dependent on a logical grouping of operational elements and a process diagram in which logical grouping of said software object is arranged.

12. The method of claim 1, further comprising automatically generating a tab view, the contents of which are dependent on at which position in a hierarchical structure below a said software object the process graphic is arranged.

13. The method of claim 1, further comprising determining a logical grouping of a new object and storing tab information for the new object according to the logical grouping so determined.

14. The method of claim 1, further comprising updating the objects in a tab view, and updating with any child objects of the new objects found in the tab view.

15. The method of claim 1, further comprising receiving in the control system a manual request to update the objects in a designated view, and updating the said designated view with all new objects found the corresponding hierarchical logical group.

16. The method of claim 1, further comprising generating in the control system a prompt to an operator or other user suggesting that a manual request to update all the links or objects in a designated view should be made.

17. The method of claim 1, further comprising maintaining a given designated view arranged with a tab visible at all times on an operator display.

18. The method of claim 1, further comprising hiding a given designated view arranged with a tab on an operator display when one or more conditions are met.

19. The method of claim 1, further comprising displaying context-sensitive information in a sub tab view of the selected tab view.

20. The method of claim 1, further comprising automatically generating a view of the locations of all instances of a given software object in one or more structures in the control system.

21. The method of claim 1, further comprising detecting a computer cursor or mouse position over a tab and displaying a small graphic or thumbnail of a destination process graphic accessible from the designated view by means of the tab.

22. The method of claim 1, further comprising providing a designated view arranged with a tab or similar, arranged with means to select by means of layers which of the available items of said information shall be visually displayed or otherwise presented prominently, or displayed less prominently, or hidden.

23. A computer program for providing a user interface for an industrial control system comprising:
   a computer;
   a storage medium; and
   a plurality of process graphics comprising software objects for controlling and/or monitoring control objects controlled by said control system, said program containing software code portions to make a computer or processor carry out a method according to claim 1.

24. The method of claim 1, further comprising detecting a computer cursor or mouse position over a tab and displaying a small graphic or thumbnail of a destination process graphic arranged with one or more simple indicators, representing a blinking lamp or similar, superimposed on the process graphic to show an alarm, or alarm still open, or a particular class of event.

25. A user interface for an industrial control system having a computer, a display device and a plurality of process graphics comprising one or more software objects for controlling and/or monitoring control objects controlled by said industrial control system, said one or more software objects arranged in one or more of a plurality of hierarchical functional groups or structures, such that elements of one or more of the software objects or part thereof may be displayed on the user interface displayed on said display device, the user interface comprising:

- computer program means for automatically generating one or more designated views arranged with a tab for loading a new process graphic into the designated view of a selected tab and displaying the one or more designated views,
- wherein each designated view comprises one or more tabs and comprises any of said process graphics software objects or elements,
- wherein each designated view is dependent on location of a said software object in a said hierarchy of object instances or a said structure,
- wherein the computer program means update the objects in a designated view with a tab, and update the said designated view with all new objects found the corresponding hierarchical logical group,
- wherein the computer program means compare any new objects found in the designated view with one or more criteria for the designated view and include the new objects meeting the criteria, and
- wherein the computer program means compare any new objects found in the designated view with criteria and determine a logical grouping of a new object.

26. The user interface of claim 25, wherein the user interface is arranged with computer hardware and software means for loading a new process graphic into the designated view of the selected tab.

27. The user interface of claim 25, wherein the user interface is arranged with computer hardware and software means for highlighting a tab in the designated view based on which said process graphic is currently displayed in the interface.

28. The user interface of claim 25, wherein the user interface is arranged with computer hardware and software means for automatically displaying one or more selected tabs dependent on a said process graphic displayed on the interface and its location in the said hierarchy of object instances or a said structure.

29. The user interface of claim 25, wherein the user interface comprises means for automatically displaying one or more tabs in a subtab view providing direct access to objects in a lower level in said hierarchy of object instances or a said structure than the displayed said process graphic.

30. The user interface of claim 25, wherein the user interface is arranged with computer hardware and software means for automatically displaying, on a tab containing a static reference to a process graphic, a dynamic information display or a dynamic value.

31. The user interface of claim 30, wherein the user interface comprises means for automatically displaying on a tab a dynamic value for the number of active alarms for a process section.

32. The user interface of claim 25, wherein the user interface comprises software means for automatically updating the said tab view with all new objects found in a hierarchical group, logical group or structure.

33. The user interface of claim 25, wherein the user interface comprises means for automatically updating the said tab view with all new objects found in a hierarchical group, logical group or structure upon receipt of a configuration request to update the objects in a tab view.

34. The user interface of claim 33, wherein the user interface comprises computer program means for automatically comparing any new objects found in a tab view with criteria and determining a logical grouping of a new object.

35. The user interface of claim 25, wherein the user interface comprises computer program means for automatically comparing any new objects found in a tab view with one or more criteria for a tab and including the new objects meeting the criteria.

36. The user interface of claim 35, wherein the user interface comprises computer program means for automatically determining a logical grouping of a new object and storing tab information for the new object according to the logical grouping so determined.

37. The user interface of claim 25, wherein the user interface comprises computer program means for automatically displaying one or more selected tabs dependent on a task for an operator, the task comprising and not limited to any from the group of: start up, operate, change operation, alarm handling tasks, specific process related tasks, maintenance, shut down.

38. The user interface of claim 25, wherein the user interface comprises computer program means for automatically displaying one or more selected tabs which are displayed dependent on a status of a process controlled by said control system, the status comprising and not limited to any from the group of: start, run, process change, event, alarm, stop, offline, configuration or maintenance, simulation.

39. The user interface of claim 25, wherein the computer program means further comprises detecting a computer cursor or mouse position over a tab and displaying a small graphic or thumbnail of a destination process graphic arranged with one or more simple indicators, representing a blinking lamp or similar, superimposed on the process graphic to show an alarm, or alarm still open, or a particular class of event.

40. An industrial control system comprising:
- a computer and a display device;
- a user interface; and
- a plurality of process graphics comprising one or more software objects for controlling and/or monitoring control objects controlled by said industrial control system, said one or more software objects arranged in one or more of a plurality of hierarchical functional groups or structures, such that elements of one or more of the software objects or part thereof may be displayed on an interface displayed on said display device,
- wherein said user interface comprises means for:
    - automatically generating one or more designated views, each said designated view comprising one or more tabs for loading a new process graphic into the designated view of a selected tab and displaying the designated view, and any of said process graphics, software objects or elements dependent on location of a said software object in a said hierarchy of object instances or a said structure, updating the objects in a designated view with a tab, and updating the designated view with all new objects found the corresponding hierarchical logical group, comparing any new objects found in the designated view with one or more criteria for the designated view and including the new objects meeting the criteria, and comparing any new objects found in the designated view with criteria and determining a logical grouping of a new object.

41. The system of claim 40, further comprising computer means or user interface means for receiving input to select a tab arranged on one of one or more designated views.

42. The system of claim 40, further comprising computer means or user interface means for determining selection of the designated view by the input to the tab.

43. The system of claim 40, further comprising computer program means stored in a memory storage device or processor of the system which when run on a computer or processor, the computer program means carrying out the steps of automatically generating one or more designated views each said designated view comprising one or more tabs and further comprising any of said process graphics, software objects or elements dependent on location of a software object in a said hierarchy of object instances or a said structure.

44. The system of claim 40, wherein said user interface further comprises means for detecting a computer cursor or mouse position over a tab and displaying a small graphic or thumbnail of a destination process graphic arranged with one or more simple indicators, representing a blinking lamp or similar, superimposed on the process graphic to show an alarm, or alarm still open, or a particular class of event.

45. Using an industrial control system, said industrial control system comprising means for:

automatically generating one or more designated views, each said designated view comprising one or more tabs for loading a new process graphic into the designated view of a selected tab and displaying the one or more designed views and any of said process graphics, software objects or elements, updating the objects in a designated view with a tab, and updating the said designated view with all new objects found the corresponding hierarchical logical group, comparing any new objects found in a designated view with one or more criteria for a designated view and including the new objects meeting the criteria, comparing any new objects found in a designated view with criteria and determining a logical grouping of a new object, wherein the one or more designed views are dependent on location of a software object in a said hierarchy of object instances or a said structure on one or more display screens of a control system, for monitoring an oil and gas extraction, production or processing installation, for generating and providing information in a control system of an oil or gas storage, treatment or process installation.

46. Using an industrial control system wherein said control system comprises means for:

automatically generating one or more designated views each said designated view comprising one or more tabs and further comprising any of said process graphics, software objects or elements, updating the objects in a designated view with a tab, and updating the said designated view with all new objects found the corresponding hierarchical logical group, comparing any new objects found in a designated view with one or more criteria for a designated view and including the new objects meeting the criteria, and comparing any new objects found in a designated view with criteria and determining a logical grouping of a new object, wherein the one or more designed views are dependent on location of a software object in a said hierarchy of object instances or a said structure for generating and providing information in a control system of an industrial automation or process installation.

47. A method for navigating in an industrial control system having a computer, and a plurality of process graphics, said industrial control system comprising one or more software objects for controlling and/or monitoring control objects controlled by said control system, said one or more software objects arranged in a hierarchical way in one or more of a plurality of functional groups or structures, in which one or more of the software objects may be displayed on an interface displayed on a display device, wherein said interface automatically provides on selection of one or more of said software objects by a user, one or more designated views comprising at least one tab for loading a new process graphic into the designated view of a selected tab and displaying the one or more designated views, which one or more designated views comprise any of said process graphics software objects or elements and which contents of a designated view are generated automatically based on the location of a software object in said hierarchy of object instances or a said structure and loaded and displayed on the interface dependent on location of a software object in a said hierarchy of object instances or a said structure, and wherein the method comprises steps of:

updating the objects in the designated view with a tab, and updating the said designated view with all new objects found the corresponding hierarchical logical group, comparing any new objects found in the designated view with one or more criteria for the designated view and including the new objects meeting the criteria, and comparing any new objects found in the designated view with criteria and determining a logical grouping of a new object.

* * * * *